(12) United States Patent
Hoffman

(10) Patent No.: US 6,460,071 B1
(45) Date of Patent: Oct. 1, 2002

(54) SYSTEM AND METHOD FOR MANAGING CLIENT APPLICATION STATE IN A STATELESS WEB BROWSER ENVIRONMENT

(75) Inventor: Richard Dale Hoffman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/976,214

(22) Filed: Nov. 21, 1997

(51) Int. Cl.[7] ............................................... G06F 15/16
(52) U.S. Cl. ...................... 709/203; 709/245; 707/200; 711/209
(58) Field of Search ............................... 709/203, 212, 709/213, 216, 217, 226, 227, 201, 211; 707/205, 206, 202, 200; 711/209

(56) References Cited

U.S. PATENT DOCUMENTS

| | | | | |
|---|---|---|---|---|
| 5,794,256 A | * | 8/1998 | Bennett et al. ............. | 707/206 |
| 5,822,539 A | * | 10/1998 | Van Hoff ................... | 709/236 |
| 5,835,724 A | * | 11/1998 | Smith ......................... | 709/227 |
| 5,909,540 A | * | 6/1999 | Carter et al. ................ | 714/4 |
| 5,946,698 A | * | 8/1999 | Lomet ........................ | 707/202 |
| 5,956,509 A | * | 9/1999 | Kevner ....................... | 709/330 |
| 5,987,506 A | * | 11/1999 | Carter et al. ................ | 709/201 |
| 6,047,356 A | * | 4/2000 | Anderson et al. .......... | 711/129 |
| 6,115,744 A | * | 9/2000 | Robins et al. .............. | 709/203 |

* cited by examiner

*Primary Examiner*—Mark H. Rinehart
*Assistant Examiner*—Marc D. Thompson
(74) *Attorney, Agent, or Firm*—Duke W. Yee; Jeffrey S. LaBaw; Stephen J. Walder, Jr.

(57) ABSTRACT

A system and method for maintaining application state information in a stateless environment. State data of arbitrary length is stored in a storage area at a location referenced by a storage handle. The storage handle is recorded by the application and is used to reaccess the data as required. The storage handle is defined as a short fixed length field enabling compact reference and use regardless of the amount of data stored. Storage space is periodically reclaimed and reused after being freed by the application.

14 Claims, 2 Drawing Sheets

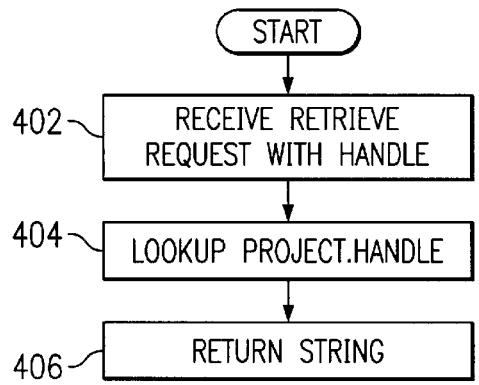
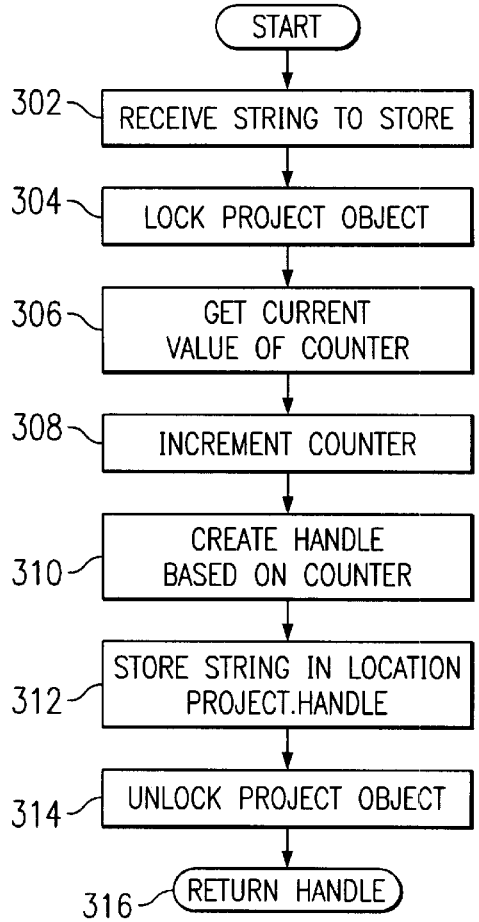
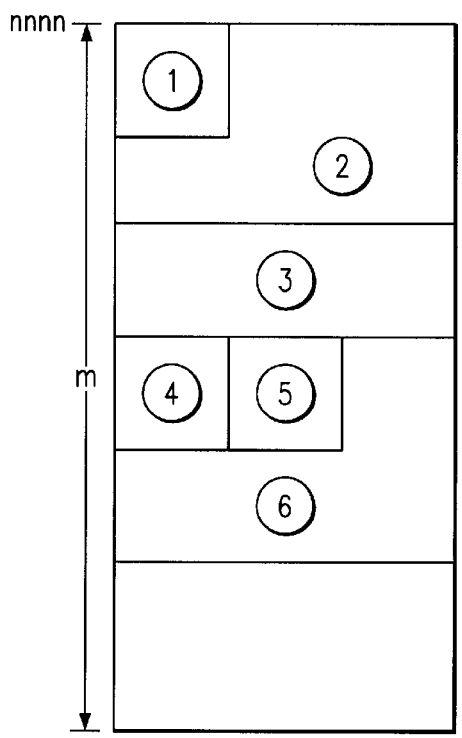

SYSTEM AND METHOD FOR MANAGING CLIENT APPLICATION STATE IN A STATELESS WEB BROWSER ENVIRONMENT

BACKGROUND OF THE INVENTION

1. Field of the Invention

The present invention relates to information management in a computer system. In particular, it relates to a structure and process for maintaining client application information in a stateless web browser/web server environment. More particularly, the present invention relates to a process for storing and retrieving arbitrary state information for a client application in a web server that does not otherwise retain state information.

2. Background and Related Art

The Internet and World Wide Web enable web users to view or browse large volumes of information from their desktop computers. The client system and server system communicate using a network protocol such as the Hypertext Transfer Protocol (HTTP.) Each complete exchange between a client browser and a server is independent of all other exchanges. A complete exchange (or transaction) includes a client request for data and a server response providing the requested data. The server does not retain any information for use when the client makes additional requests of that server. The client browser/server environment is therefore a stateless environment because each transaction is independent of the previous application state.

Independent transactions are not problematic when the client is simply requesting pages of stored information. Most browsers support an ability to include limited state information in the response to the client. For example, the server response may include information about the file and page returned so that the client can make a "next page" request of the server. State information is preserved in current browsers using one of three techniques: saving data in the uniform resource locator (URL) used to locate the server; saving data in hidden fields on the page of data returned by the browser; or saving data in a "cookie" on the client workstation. For example, a URL for paging through a particular file can store the file and page as follows:

http://domain/appln/tnpage?name=test.file&page=3

Storing data in the URL is limited to approximately 2–4 k bytes of data per URL. It is also awkward to retain large amounts of data because the string containing the data becomes long and complicated. The server software must parse the string to obtain the data thereby decreasing application response time.

The second approach for storing data is also limited by the size of the page returned. The use of cookies is limited by client storage limitations and requires the user to permit local cookie storage. Users often disable cookie storage for security reasons. If cookie storage is disabled, an application relying on cookies for state information would fail. In all three cases, state information must be sent from the server to the client which then returns the information to the server in the next request so the server can establish the state before continuing. This exchange increases the load on network resources and slows transaction response time and capacity by adding e.g. 4 K to each transmission in each direction. Exchanging information between the client and server is impractical when an application requires a large amount of state information.

Application state maintenance is exacerbated in applications that create returned pages dynamically. Internet applications that perform complex logic often employ JavaScript programs to lookup and format data for return. JavaScript is an interpreted programming language designed by Netscape Communications for performing custom logic and dynamic page building in response to a client browser request. An application that returns dynamically constructed pages has no "file" or "page" from which to reference a "next page" or similar request. The more complex logic permitted by JavaScript encourages applications that interact with the user collecting progressively more information or progressing through a decision tree toward a final outcome. The inability to preserve state is a serious shortcoming of JavaScript applications.

Netscape has attempted to address this problem by creating a browser independent "client object" on the server. This object is created and exists once for each client session. The client object can store state information as attributes which are then accessible to subsequent client transactions. The JavaScript program implements client object storage by assigning values to the client attributes, e.g.

client.name="John Smith"

client.jobid=3725 client.textfile="c:testdata.file"

Client object state storage is an improvement over previous techniques because the data may not need to be transmitted back and forth between client and server. The client object, however, does not support complex applications. Existing client object implementations mask, but do not solve, the above problems. The client object stores data using user selected techniques. The prevalent techniques employ wrappers for URL or cookie storage and actually operate as described above. The wrappers mask the complexities of URL or cookie storage but suffer from the same storage and network transmission problems discussed above. Another selectable technique permits local server area storage, but provides no mechanism to release and reclaim that storage. This technique eventually exhausts the server storage leading to server failure. The ability to store arbitrary amounts of data is limited by the need to allocate client object storage for each server client. The limited allocation restricts the amount of data that can actually be retained for an application. The client object does not satisfy the need to retain large amounts of state information in a complex network based application. Thus, a technical problem exists of providing a method or system for storing arbitrarily complex application state information in a stateless web browser environment.

SUMMARY OF THE INVENTION

The present invention is directed to a system, method and computer program product for managing an arbitrary state of an application in an otherwise stateless browser environment.

The present invention is directed to a computer implemented method for retaining state information on a server, the method comprising the steps of: defining an object storage area in memory, if not previously defined; receiving a request to store a piece of data in the object storage area; incrementing an item count of the number of pieces of data stored in the object storage area; creating a storage reference based on the item count; and storing the piece of data in the object storage at a location referenced by the storage reference.

It is therefore an object of the invention to provide a means for storing arbitrary application state without transmitting the state back to the client browser.

It is another object of the present invention to enable storage of arbitrarily sized amounts of information without penalizing web server performance.

It is yet another object of the invention to enable programmatic access to retained state information and to enable explicit freeing and garbage collection of storage resources.

The foregoing and other objects, features and advantages of the invention will be apparent from the following more particular description of a preferred embodiment of the invention, as illustrated in the accompanying drawing wherein like reference numbers represent like parts of the invention.

BRIEF DESCRIPTION OF THE DRAWING

FIG. 3 is a flowchart illustrating the store process flow of the present invention.

FIG. 4 is a flow chart illustrating the retrieve process flow of the present invention.

FIG. 5 is a block diagram illustrating the use of the memory project object according to the present invention.

DETAILED DESCRIPTION

The expanded use of the Internet for business and personal transactions has led to a continued expansion of the number of applications executable over the Internet. Complex applications including travel reservation and ticketing and banking from home require software programs that are themselves complex. Application programming of network applications is made more difficult by the stateless environment of the Internet. Each request from the client browser is processed by an application independently and without knowledge of any previous interaction with that client. The client browser may supply previous state information with the request, though this is limited by network capacity and browser and server software limitations.

Figure 1:
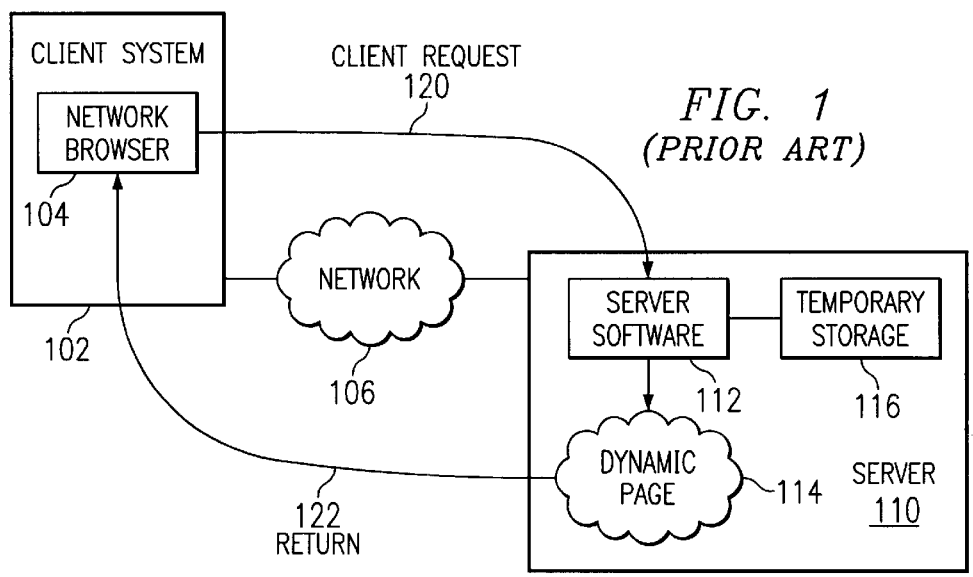
FIG. 1 is a block diagram of a prior art web browser—web server configuration.

A simplified view of client/server interaction is shown in FIG. 1. A client system 102 has a network browser 104 for displaying data accessed from the Internet. The client system can be any computer system capable of connecting to a network and executing browser software. Examples of such systems include IBM Personal Computers, Apple Macintosh computers, and various Intel microprocessor based computers from Compaq, Dell and others. In addition, workstations such as the IBM RS/6000 workstation, and workstations from Sun Microsystems, and Hewlett-Packard may be used. Browsers include the Netscape Navigator and Netscape Communicator from Netscape Communications, the Microsoft Internet Explorers and others.

Client 102 is connected through a network 106 to a server 110. The server can be hosted by the computers listed above and includes server software 112 such as Netscape SuiteSpot, Microsoft Internet Server, IBM Internet Connection Server, and Lotus Domino server. The server software must be responsive to requests made using the Hypertext Transfer Protocol (HTTP). The preferred embodiment of the present invention operates in a server that supports JavaScript, the interpretive programming language developed by Netscape Communications to implement complex logic in a web server. A JavaScript program can dynamically generate web pages in response to a client request 120 by, for example, extracting data from a database and reformatting that data for presentation to the client. JavaScript operating in server software 112, for example, can generate a dynamic page 114 for return 122 to requesting browser 104. Server software 112 has a limited amount of temporary storage 116 but does not retain application state information.

The preferred embodiment of the present invention improves the JavaScript processing by enabling state information storage. State information according to the present invention can be stored in JavaScript temporary storage 116 or, preferably, in a memory area managed by computer logic operating in accordance with the present invention.

Figure 2:
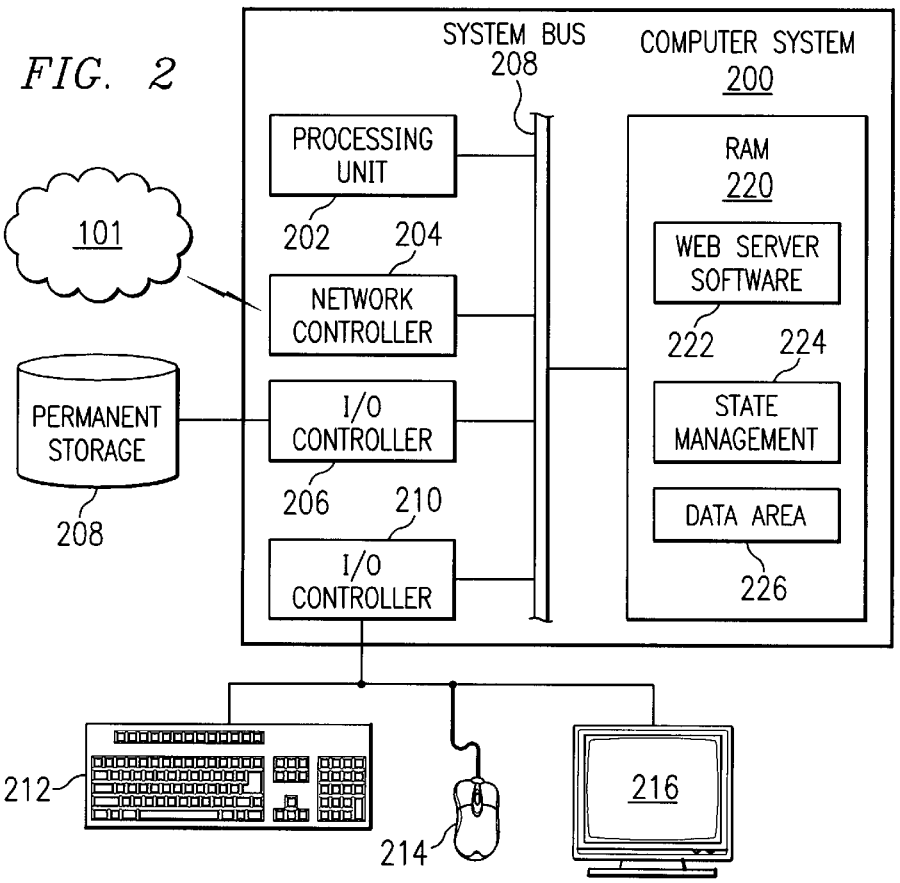
FIG. 2 is a block diagram of a computer system according to the present invention.

A web server embodying the present invention is shown generally at 200 in FIG. 2. Computer system 200 includes one or more processing units 202 connected to a system bus 208. Random access memory 220 is in turn connected to the system bus and is accessible to the processor and peripheral devices. The server communicates with the network 106 through network controller 204. Input/Output controller 206 manages system interaction with permanent storage 208 which can comprise both fixed and removable media. Input/Output controller 210 manages user interaction through keyboard 212, display 216 and pointing device 214.

The present invention is preferably embodied as a computer program product that can be copied into system memory 220. The program can be coded using the C programming language or any other language to which JavaScript can be linked. The present invention operates in conjunction with web server software 222 and extends the function of that software. State management according to the present invention, is illustrated as element 224 in the figure. Data area 226 is used by the state manager to store state information. Data area 226 is preferably an area of memory controlled by the state manager and designated the "project object", though in the alternative, it could be a special purpose JavaScript object. A project object is allocated when first used and is available to all clients accessing a particular application on the server. Although shown as separate components for illustrative purposes, the present invention and storage area may be indistinguishably combined with server software 222 without departing from the spirit of the invention.

State manager 224 is responsive to server requests to store or retrieve application state information. The server requests are preferably JavaScript invocations of store and retrieve functions according to the present invention. The process of the present invention will be described with reference to FIGS. 3 and 4.

A request to store state information is received 302. The preferred embodiment stores strings of textual information, but state information can include any other type of binary information. The project object is locked 304 to prevent conflicting access by another process. The current value of the project object counter is retrieved 306. This counter represents the number of pieces of stored state data in the project object. The preferred embodiment does not reuse numbers once a piece of state data is released, though, in an alternate embodiment, numbers could be reused without departing from the invention.

The counter is incremented 308 and used to build a reference handle 310. Reference to the stored data will be made using the handle. The handle is defined to have a fixed short length of, in the preferred embodiment, eight bytes. This limits the amount of storage required to pass the handle back and forth to the client browser. Handles can be of the form "VAR_1", "VAR_2" or similar structure.

JavaScript supports object oriented programming techniques. "Objects" in an object oriented system encapsulate program logic (methods) and program data (attributes.) The attributes of an object are referenced using the pair "object.attribute." After a handle is created, an object attribute project.handle is created and used to store the supplied state data 312. The object name project will change based upon the specific implementation and application.

Finally, the project object is unlocked 314 and the data handle returned to the calling program 316.

The present invention enables efficient use of system memory by dynamically allocating memory within the project object. The preferred embodiment initially allocates an area of m bytes starting at address nnnn (see FIG. 5.) This area can be static, or can be dynamically alterable depending on the implementation. As a piece of data is stored it is placed in the object at the next available memory location. Thus the first item, with, for example, the handle VAR_1 is stored in the area labelled (1) in the Figure. The second item is considerably larger and is stored in area (2). Each area of the project object is assigned in turn.

The data handle is passed between processes by including it with the page data sent back and forth to the client browser. It can be stored as a variable in the URL, exchanged as a cookie, or as a hidden field. In addition, the handle could be stored in the client object. In each case the present invention increases the performance and flexibility by using a short fixed length handle regardless the amount of state data stored.

Application state data is retrieved from the project object by supplying the data handle to the state data manager 402. The state data manager looks up the attribute project.handle 404, retrieving the stored data from the project object. The retrieved data is returned to the calling program 406.

In operation, a first JavaScript program would create and store a piece of state data using the above described process. The handle returned by the state data manager would be returned to the client browser as a variable or stored data field. The server program next invoked by the client browser can look for the state data handle in the client request. Server logic can be provided to extract the handle or to take other action in its absence. The handle is then used to access the state data which can then be loaded and used by the second program. Once an application determines that certain data is no longer needed, it can release the storage used by issuing and explicit FREE(handle) command to the state data manager. Released storage can be periodically reclaimed using a garbage collection process.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A computer implemented method for retaining application state information on an otherwise stateless server, the method comprising the steps of:
    defining an application state object in memory;
    determining an item count corresponding to a number of pieces of currently stored application state data in the application state object;
    receiving a request to store a piece of application state data in the application state object;
    incrementing the item count to generate an incremented item count;
    creating a storage reference based on the incremented item count, wherein the storage reference identifies the piece of application state data within the application state object from other pieces of application state data within the application state object; and
    storing the piece of application state data in the application state object at a location referenced by the storage reference.

2. The method of claim 1, further comprising the steps of:
    returning the storage reference in response to the request to store a piece of application state data.

3. The method of claim 2, further comprising the step of: freeing a portion of the application state object at a location referenced by a storage reference in response to a free request including the storage reference.

4. The method of claim 3, further comprising the step of:
    periodically reclaiming freed portions of the application state object and making storage reference in response to a free request including the storage reference.

5. The method of claim 1, wherein the application state object is globally defined for a project and accessible to all applications in the project.

6. The method of claim 1, further comprising the steps of:
    receiving a request to retrieve a piece of application state data, the request including a storage reference; and
    returning, from the application state object, the piece of application state data stored at a location in the application state object referenced by the storage reference.

7. A system for application state management in a stateless browser environment comprising:
    storage means for storing data at addressable locations within an application state object;
    means for maintaining an item count of currently stored application state data in the application state object;
    means for receiving a request to store a piece of application state data within the application state object;
    means for incrementing the item count to generate an incremented item count;
    means for storing the piece of application state data at an addressable location within the application state object; and
    means for associating the incremented item count with the addressable location of the piece of application state data to generate an item count association, wherein the item count association identifies the piece of application state data within the application state object from other pieces of application state data within the application state object.

8. The system of claim 7, further comprising:
    means for retrieving data from an addressable location within the application state object referenced by the item count association.

9. The system of claim 8, further comprising:
    means for freeing the addressable location within the application state object in response to a free request containing the item count association.

10. The system of claim 9, further comprising:
    means for periodically reclaiming freed storage and enabling reallocation of said reclaimed storage in response to data store requests.

11. A computer program product having a computer readable medium having computer program logic recorded thereon for managing application state in a stateless web server environment, said computer program product comprising:

computer program product means for allocating an application state object for application state storage;

computer program product means for determining a reference corresponding to a number of pieces of currently stored stat data in the application state object;

computer program product means for receiving a request to store state data in the application state object; and computer program product means for incrementing the reference to generate an incremented reference and for storing the stat data at a location in application state object referenced by the incremented reference, wherein the reference identifies the state data within the application state object from other state data within the application state object.

12. The computer program product of claim 11, further comprising:

computer program product means for retrieving and returning requested state data in response to a request including a reference to the requested state data.

13. The computer program product of claim 11, further comprising:

computer program product means for freeing storage space assigned to state data in response to a request containing a reference to the state data.

14. The computer program product of claim 13, further comprising:

computer program product means for periodically reclaiming freed space in the application state object for reuse.

* * * * *